United States Patent [19]

Piltz et al.

[11] 4,210,618

[45] Jul. 1, 1980

[54] METHOD OF MAKING TEAR OPENING DEVICES FOR CONTAINERS

[75] Inventors: Lars-Eric Piltz, Dalby; Bo T. Quist, Bjärred; Folke Kiellarson, Barsebäck; Siwer Månsson, Lund; Bengt Nilsson, Södra Sandby, all of Sweden

[73] Assignee: AB Akerlund & Rausing, Sweden

[21] Appl. No.: 25,772

[22] Filed: Apr. 2, 1979

Related U.S. Application Data

[62] Division of Ser. No. 721,866, Sep. 9, 1976.

[30] Foreign Application Priority Data

Sep. 12, 1975 [SE] Sweden ............................ 7510169
Sep. 12, 1975 [SE] Sweden ............................ 7510170

[51] Int. Cl.² .................... B29F 1/00; B29D 31/00
[52] U.S. Cl. .................... 264/130; 156/69; 156/245; 156/289; 156/290; 220/257; 220/258; 220/270; 229/43; 264/134; 264/135; 264/264; 264/328
[58] Field of Search .......... 220/270, 257, 258; 229/43; 264/130, 134, 135, 264, 328; 156/69, 289, 290, 291, 245

[56] References Cited

U.S. PATENT DOCUMENTS

3,762,598  10/1973  Gaynor et al. ................ 156/257

FOREIGN PATENT DOCUMENTS

945985  11/1961  United Kingdom.
998103   7/1965  United Kingdom.

*Primary Examiner*—W. E. Hoag
*Attorney, Agent, or Firm*—Lerner, David, Littenberg & Samuel

[57] ABSTRACT

A method for manufacturing an opening device for a package is disclosed. The opening device comprises an outer wall portion an an inner layer of substantially gas-tight material, the outer wall portion including a first tearing notch defining an opening and a second tearing notch defining a grip tongue, and the outer wall and the inner layer being interconnected substantially over their total surfaces facing each other with the outer wall portion and the inner layer being separated within an area substantially under the grip tongue. The method comprises the steps of coating the inner layer with an adhesion preventing coating within an area corresponding to said grip tongue, and connecting the inner layer to the substantially rigid outer wall portion.

4 Claims, 17 Drawing Figures

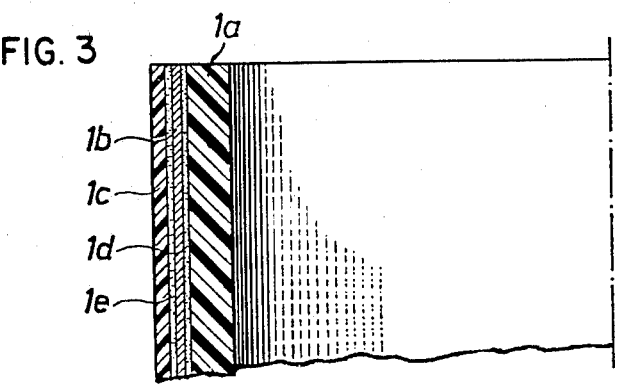
FIG. 3
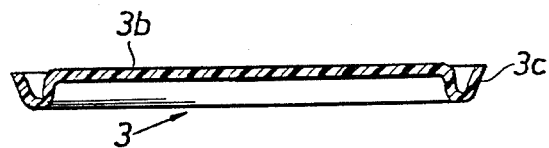
FIG. 4A
FIG. 4B
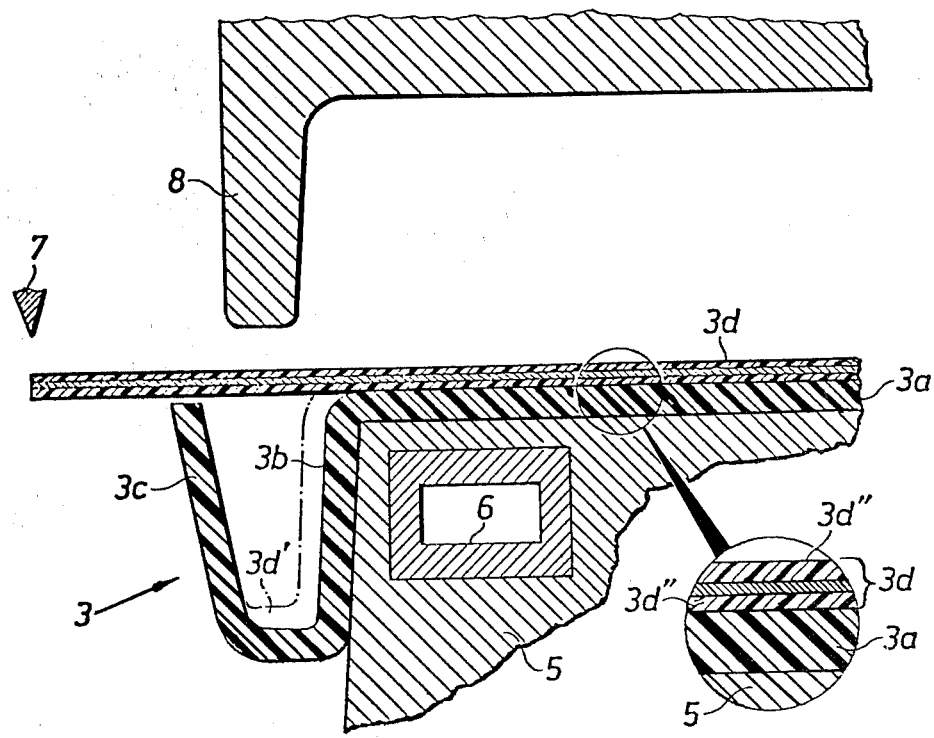

METHOD OF MAKING TEAR OPENING DEVICES FOR CONTAINERS

This is a division of application Ser. No. 721,866, filed Sept. 9, 1976.

SUMMARY OF THE INVENTION

The object of the invention in the first place is to produce a tight, easy to open, can-like package having a low weight and suited as well to liquid as to dry products. In the following the invention therefore will be described with reference to such an example. To a professional man, however, it is obvious from the following specification that the invention also is more universally applicable.

In the following the invention is described with reference to the accompanying drawings which by way of example illustrate a can-like package and an opening device for this and similar packages, and which further illustrate a method to manufacture said particulars.

DESCRIPTION OF THE DRAWING

FIG. 3 is a section through a portion of the wall of the middle part of the package according to FIG. 1.

FIG. 4a shows a bottom part of the package according to FIG. 1 before the mounting thereof.

FIG. 4b illustrates the method to manufacture the bottom part according to FIG. 4a.

DETAILED DESCRIPTION

Figure 1:
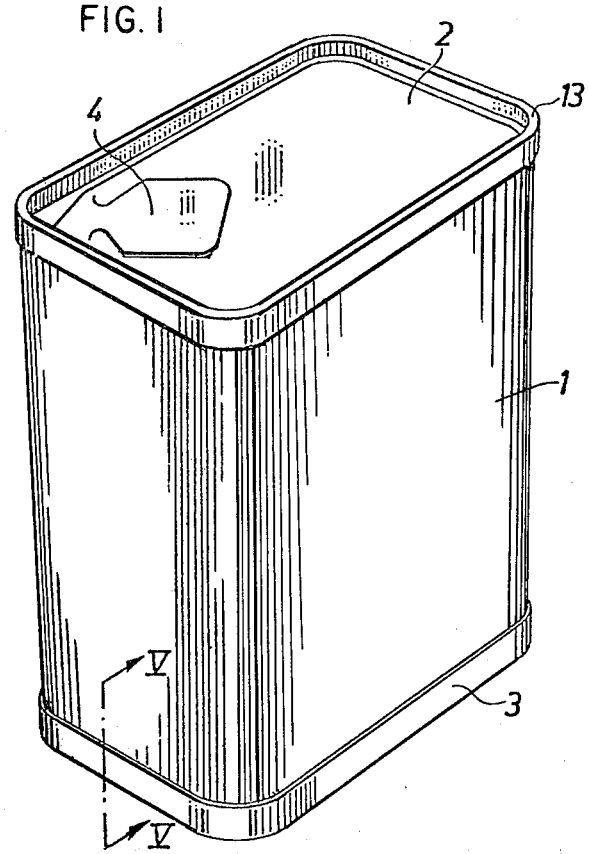
FIG. 1 schematically shows the finished can-like package with an indicated opening device.

The package shown in FIG. 1 by way of example consists of a case-like middle part 1 and cap and bottom parts 2 and 3, respectively, attached thereto, the cap part being provided with an opening device.

Figure 2A:
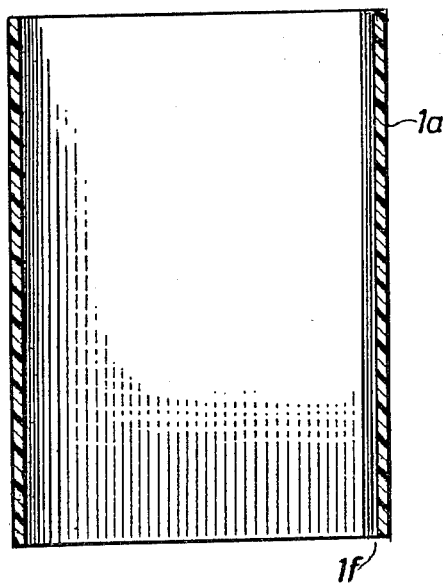
FIGS. 2a and 2b are two sections perpendicular to each other through a body intended to be used for the manufacture of the middle part of the package according to FIG. 1.
Figure 2B:
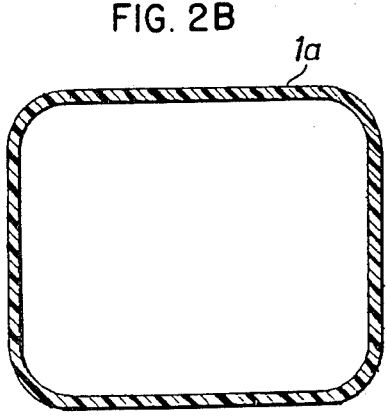

As best shown in FIGS. 2a, 2b and 3, the middle part 1 is made up of an inner body 1a forming an inwardly unbroken, or seamless, plastic layer, an intermediate layer 1b of aluminium foil or a corresponding substantially gastight material, and an outer plastic layer 1c protecting said intermediate layer 1b. The intermediate layer of aluminum on each side may be enclosed with glue layers 1d and 1e, respectively. The adhesion, however, also may be effected in another way, for instance by means of inductive welding.

The bottom part 3 is more closely shown in FIGS. 4a and 4b, of which the latter figure illustrates the method to manufacture the bottom part. This bottom part consists of an outer plastic layer 3a which is thermoformed or formed in another way, for instance injection moulded with a portion 3b extending into the middle part 1 and a frame portion 3c surrounding the bottom edge 1f of the middle part. On the inside the bottom part is provided with a layer 3d of aluminium foil or a corresponding substantially gastight material which therefore is protected by the outer plastic layer 3a. The layer 3d may be attached to the layer 3a as shown in FIG. 4b. The layer 3a is arranged on a mandrel 5 provided with an inner inductor 6 for inductive welding. On the top of the portion 3a is placed the foil 3d which may be supplied in the form of a continuous web which is punched by means of the schematically shown punch 7. After the punching the foil 3d is depressed into the frame portion 3c by means of a forming tool 8. If necessary, said tool may be cooled in order to cool the weld effected by means of the inductor. Suitably, the welding here is effected in such a way that the greater part of the foil 3d is attached to the layer 3a, whereas, however, a margin area 3d' is left free. In practice it has proved suitable for the layer 3d to use a laminate of aluminum foil between two outer layers 3d" of polypropene.

Figure 5:
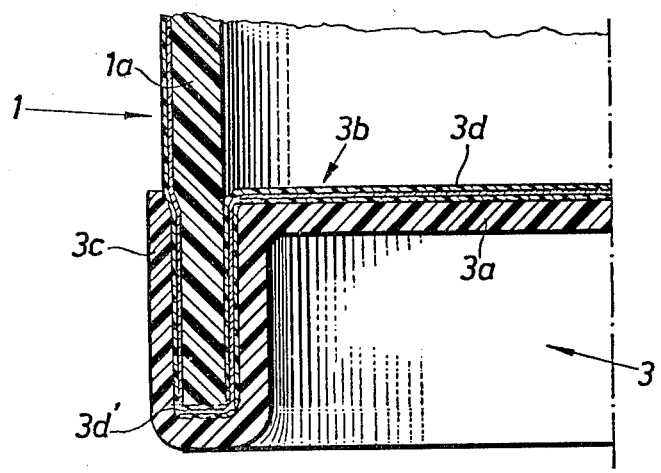
FIG. 5 shows the bottom part attached to the can-like package according to FIG. 1, i.e. a section on line V—V through the lower portion of said figure.

In FIG. 5 the bottom part 3 is attached to the middle part 1. Also this attachment operation suitably may be executed by means of inductive welding in substantially the same way as the welding of the inner foil 3d according to FIG. 4b. Simultaneously a certain calibration may take place in the end portion, as appears from FIG. 5, in order to avoid too far projecting portions.

Figure 6:
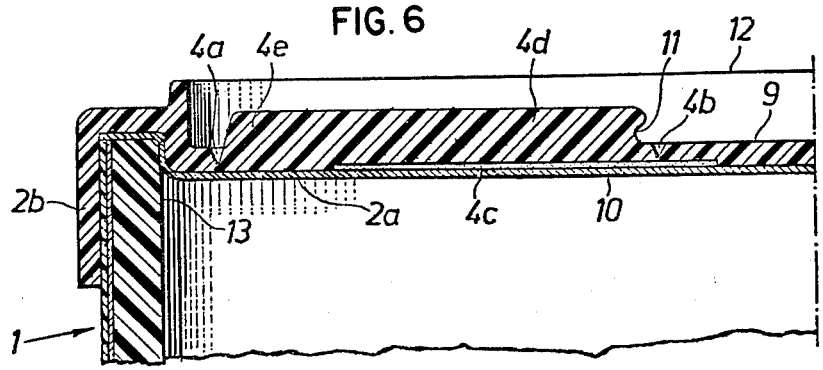
FIG. 6 is a section through the opening device which is more closely shown in FIG. 7 together with the rest of the package, as seen from above. The embodiment here is somewhat modified as compared with FIG. 1.
Figure 7:
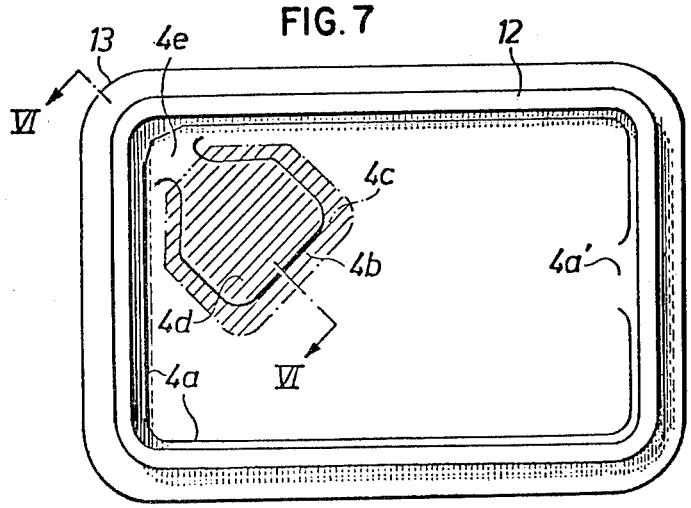

FIGS. 6 and 7 more closely and somewhat modified show the opening device indicated in FIG. 1 with reference numeral 4. The opening device consists of two tearing notches 4a and 4b, respectively, of which the tearing notch 4a defines the produced opening whereas 4b defines a grip tongue which in the example is completely located within the tearing notch 4a. Reference numeral 4c is a hatched area in FIG. 7 which indicates a lacquering between an outer suitably injection moulded top portion 9 forming an outer layer and provided with the above tearing notches 4a and 4b, and an inner layer 10 having a desired tighness. By this means the grip tongue 4d formed by the tearing notch 4b may be easily gripped. This is further facilitated in that said grip tongue 4d is made thicker and provided with a nail ridge or gripping edge 11. The grip tongue 4d runs into a prong 4e which likewise is formed with said thicker material. By this means said prong easily can pierce the inner plastic layer 9 when the grip tongue is forced upwardly from the position shown in FIGS. 6 and 7. This piercing is further facilitated when the material around the prong 4e is stiffened, for instance by means of an injection moulded stacking flange 12 or simply by means of its location in proximity to the corner portion 13 stiffened as well by the top part 2 as by the middle part 1. The tearing notches 4a and 4b either may extend to the inner plastic layer 10 or be made somewhat shallower. In both cases it may be suitable to interrupt the outer tearing notch 4a at one or more places 4a' in order to facilitate the flow of the injection moulded material. In FIG. 6 refence numeral 2a is a portion extending into the middle part 1 and being surrounded by a frame portion 2b enclosing the top edge of a middle part 1.

Figure 8:
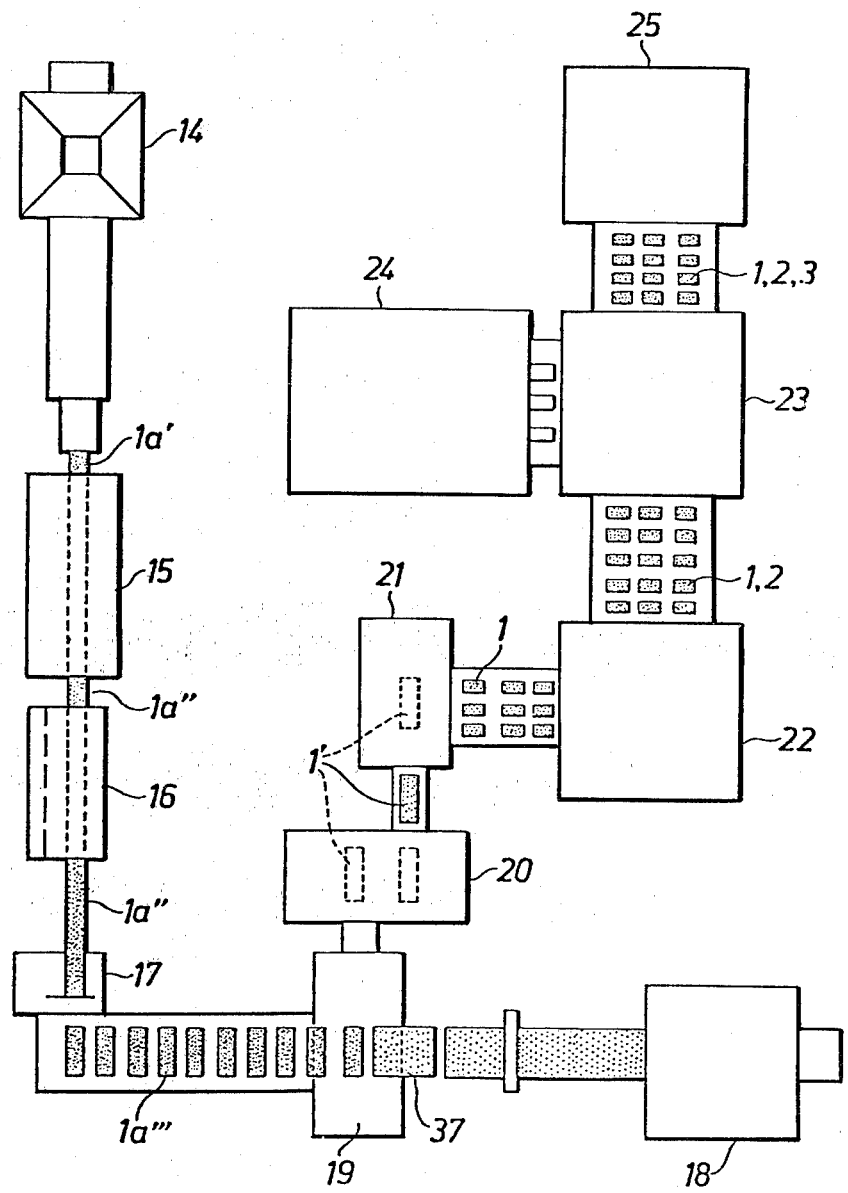
FIG. 8 schematically shows a plant for the manufacture of packages according to FIGS. 1-7.
Figure 9:
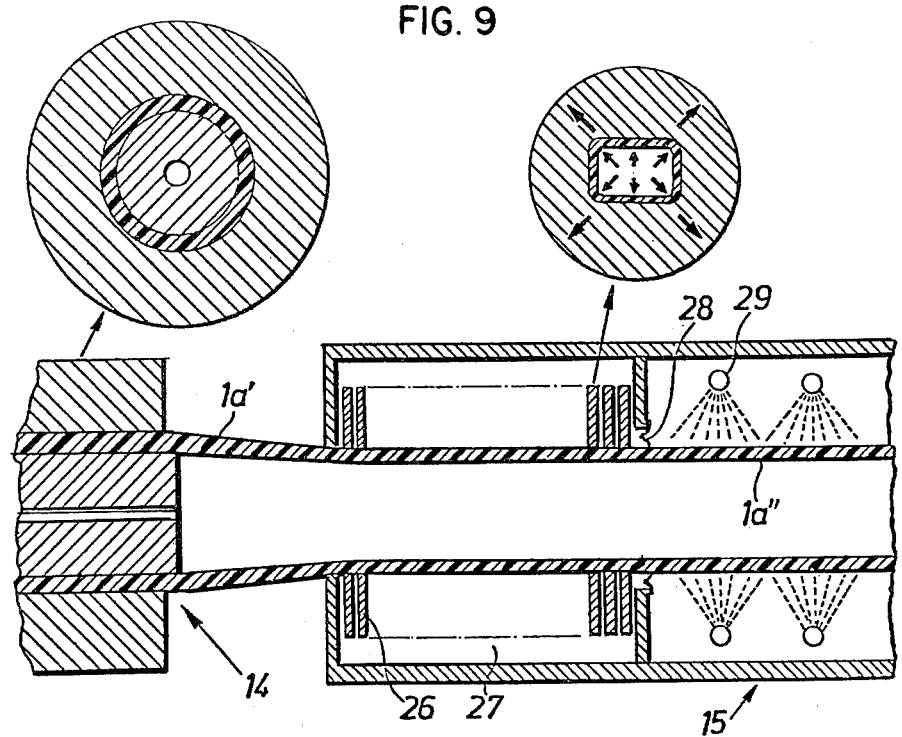
FIG. 9 shows how a round, extruded plastic tube is reshaped into a rectangular cross-section form. According to the invention, however, also other cross section forms are possible.
Figure 10:
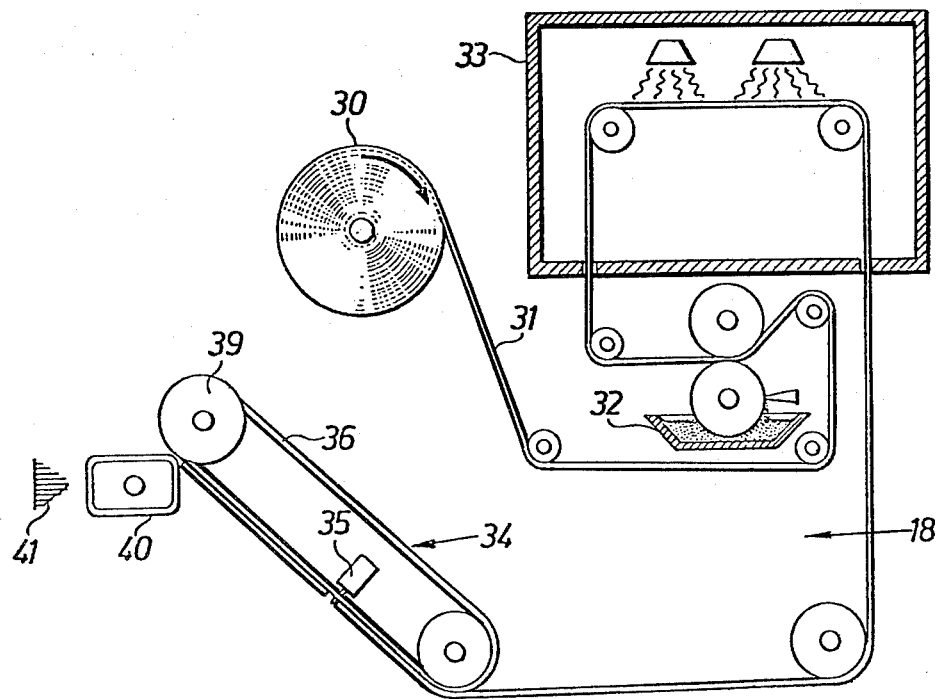
FIG. 10 schematically illustrates a method to line the body according to FIGS. 2a and 2b with a foil of aluminium or similar substantially tight material.

FIG. 8 schematically shows a plant for the manufacture of a package described above. Since many particulars of this plant either are known per se or obvious to a professional man the plant is partially shown in the form of a block diagram. In this figure, 14 is an extruder for the extruding of a round tube 1a' of plastic, for instance polypropene, polyethylene or the like. The tube has the reference numeral 1a'. The tube then moves through a calibration apparatus 15 which is more closely shown in FIG. 9 and in which the tube is reshaped into a square cross section profile. The tube now has the reference numeral 1a''. The drawing through the calibration apparatus 15 is made by means of a drawing apparatus 16 and is finished in a cross-cutting machine 17 in which body parts 1a''' are produced. Said body parts 1a''' correspond to two or more of the body parts 1a shown in FIGS 2a and 2b. The body parts are advanced to a sheet feeder apparatus 19 which is supplied with sheets from a glue application unit 18. In said unit 18 a web-shaped material, such as a laminate of, for instance, aluminum and polypropene, is provided with a glue which is partly dried. The material then is cross-cut into suitable sheets which are rolled on to the body units 1a''' as is more closely shown in FIGS. 11a and 11b. The glue application proper is best shown in FIG. 10. In this way lengths 1' are produced corresponding to two or more middle parts 1 according to FIG. 1. Said lengths 1' are transported into a curing apparatus 20 which is more closely shown in FIG. 12. Then they are further transported into a finish cutting apparatus 21 in which they are cross-cut into middle parts 1 which are transported into a cap manufacture and welding apparatus 22. The middle parts 1 with caps 2 mounted thereon are then transported to a bottom application apparatus 23 which bottoms are supplied from a bottom manufacture plant 24, for instance a vacuum forming machine. Said bottoms are here loosely mounted after which the ready packages are transported into a packaging unit 25 from which the packages are transported to filling at which the loose bottoms are temporarily removed during the filling after which they are definitely welded on to the packages. By means of this proceeding a very high hygiene can be maintained.

As mentioned above, FIG. 9 shows the calibration unit 15 in which the extruded tube 1a' is reshaped into a tube 1a'' having a rectangular cross section form. This is made by means of closely mounted discs 26 between which all along is percolating a certain quantity of water for lubrication and cooling purposes and which are enclosed in a room 27 which is under a certain negative pressure, or vacuum in order to facilitate the forming of the tube 1a'. At the rear end the room 27 is closed by a sleeve sealing 28. Outside the sealing there are further cooling water spreaders 29. This reshaping of a thin material is supposed per se to involve an important novelty. With a thin material in this case is meant a material having a thickness of about 1 mm or less.

FIG. 10 shows the glue application unit 18. In this unit a laminate 31 is removed from a roll 30 and through the glue application means 32 proper conveyed into a drying oven 33 via various pulleys (without reference numerals) and to a sheet cross-cutting unit 34 having a knife 35 and a feeding chain 36. The chain for instance may be provided with grippers for feeding the cross-cut sheets 37 (see FIG. 8). The sheets by means of a pressing roller 39 are applied to the body units 1a''' which are threaded on the mandrel 40. Before the sheets 37 are brought into contact with the units 1a''' the latter are treated by means of a schematically shown treating plant 41. This plant preferably consists of a so-called corona-apparatus but the treating also may be made in other ways, such as by means of a free flame. By this an oxidation of the surface takes place through which the adhesion of the sheets is facilitated.

Figure 11A:
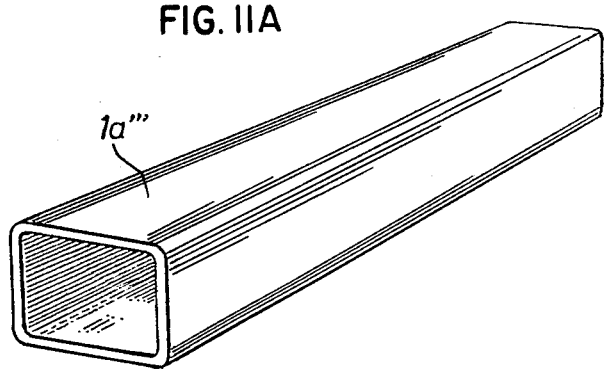
FIGS. 11a-11c more closely illustrate said lining operation.
Figure 11B:
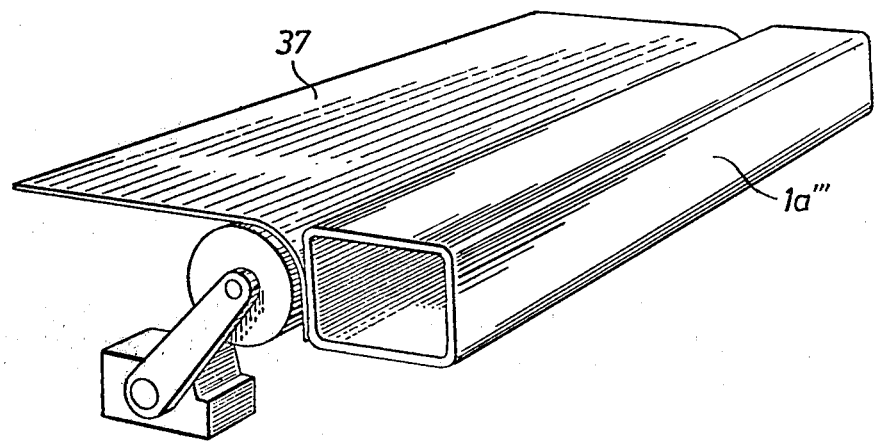
Figure 11C:
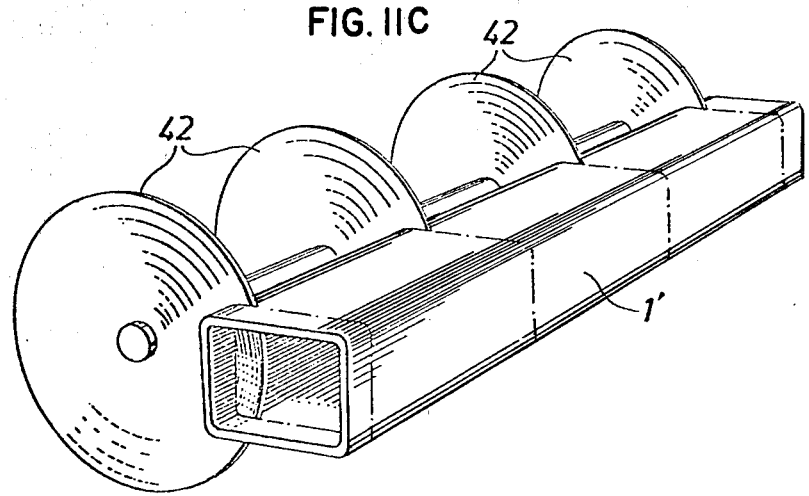
Figure 12:
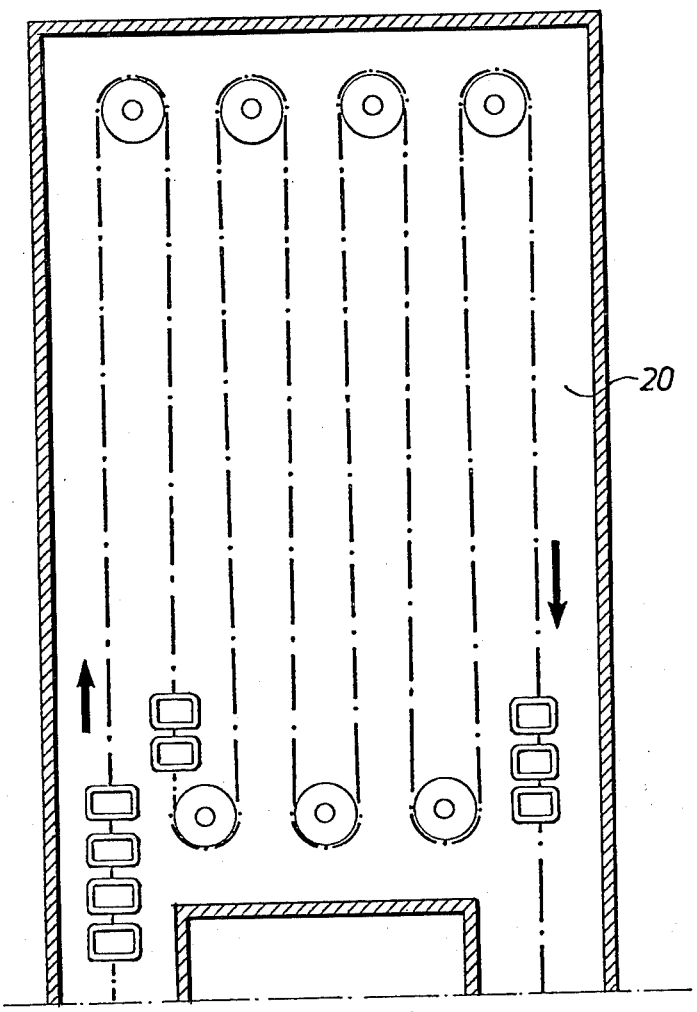
FIG. 12 shows the hardening of the lined body parts in an oven prior to the cross-cutting as shown in FIG. 11c.
Figure 13:
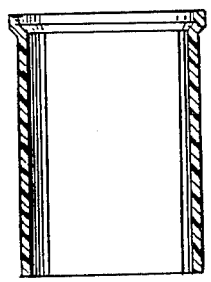
FIG. 13 illustrates the reshaping of the body parts before they are provided with caps and bottoms, respectively. Such a reshaping, however, is not always required.

FIGS. 11a through 11c schematically illustrate how the label or sheet 37 is applied to the body unit 1a''' which then is cross-cut by means of the cutting knives 42. Prior to this cutting the body units 1a''', however, preferably are conveyed through the curing oven 20 shown in FIG. 12. Such an intermediate curing has proved to facilitate the cutting in the following cross-cutting station 21, in that the hardening reduces the risk of delaminating during the cutting operation.

The invention of course is not limited merely to the embodiments described above but may be varied within the scope of the following patent claims. Thus, for instance, the thickness of the various material layers may be varied within wide limits without departing from the scope of the invention. In practice, however, it has proved appropriate to use for the inner extruded casing a polypropene material having a wall thickness less than 1 mm and preferably between 0.4 and 0.8 mm. Particularly good results have been obtained with a thickness of about 0.5 mm. On the outside this inner casing preferably is provided with a laminate material consisting of aluminum and polypropene. Here practical experimental works have proved that the aluminum layer should be between 8 and 20 microns, preferably 12 microns, and the outer polypropene layer between 20 microns and about 60 microns, preferably about 50 microns. Corresondingly, practical experimental tests have proved preferaby for the inner layer 3d of the bottoms to use a laminate of an aluminium foil between 8 and 20 microns, preferably 12 microns, between two polypropene layers of about 50 microns alternatively, in the cap is an inner layer preferably using a laminate of an aluminum foil between two films of oriented polypropene. Here the same values as mentioned above apply to the aluminum foil. For the films of oriented polypropene a thickness of 18–35 microns, preferably 20–25 microns, should be used. Also the form and construction of the particulars of course may be varied.

We claim:

1. A method for manufacturing an opening device for a package, which opening device comprises an outer wall portion and an inner layer of substantially gas-tight material, said outer wall portion including a first tearing notch defining an opening and a second tearing notch defining a grip tongue, an said outer wall and said inner layer being interconnected substantially over their total surfaces facing each other with said outer wall portion and said inner layer being separated within an area substantially under said grip tongue; the method comprising the steps of:
    (a) coating the inner layer with an adhesion preventing coating within an area corresponding to said grip tongue; and
    (b) connecting said inner layer to said substantially rigid outer wall portion.

2. A method according to claim 1, wherein said inner layer is attached to a container mouth and said outer wall portion is subsequently injection molded in the form of a cap directly on the outside of said inner layer.

3. A method according to claim 2, wherein said grip tongue portion of said outer wall is molded thicker than the surrounding outer wall portion.

4. A method according to claim 3, wherein said grip tongue portion includes a prong portion, said method further including the step of stiffening the outer wall portion in the vicinity of said prong portion.

* * * * *